(12) United States Patent
Bhattad

(10) Patent No.: US 12,367,179 B1
(45) Date of Patent: Jul. 22, 2025

(54) SYSTEM, METHOD, AND COMPUTER PROGRAM FOR AUTOMATED GENERATION OF FEED LOADER APPLICATIONS

(71) Applicant: Amdocs Development Limited, Limassol (CY)

(72) Inventor: Lakhan Bhattad, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/630,927

(22) Filed: Apr. 9, 2024

(51) Int. Cl.
*G06F 16/00* (2019.01)
*G06F 16/13* (2019.01)
*G06F 16/16* (2019.01)
*G06F 16/21* (2019.01)
*G06F 16/22* (2019.01)

(52) U.S. Cl.
CPC ............ *G06F 16/13* (2019.01); *G06F 16/164* (2019.01); *G06F 16/213* (2019.01); *G06F 16/221* (2019.01)

(58) Field of Classification Search
None
See application file for complete search history.

(56) References Cited

U.S. PATENT DOCUMENTS

| | | | |
|---|---|---|---|
| 10,540,334 B1* | 1/2020 | Eswaran | G06F 16/252 |
| 10,909,120 B1* | 2/2021 | Mohamad | G06F 16/24554 |
| 11,573,936 B2* | 2/2023 | Stolze | G06F 16/2282 |
| 2005/0125677 A1* | 6/2005 | Michaelides | H04L 63/08 713/185 |
| 2012/0089562 A1* | 4/2012 | Deremigio | G06F 16/254 707/703 |
| 2017/0118244 A1* | 4/2017 | Bai | H04L 63/20 |
| 2017/0337251 A1* | 11/2017 | Kordasiewicz | G06F 16/248 |
| 2021/0319005 A1* | 10/2021 | Mire | G06F 16/21 |
| 2021/0334251 A1* | 10/2021 | Mire | G06F 16/221 |
| 2021/0400025 A1* | 12/2021 | Agarwal | G06F 16/2379 |
| 2022/0100715 A1* | 3/2022 | Lee | G06F 16/258 |
| 2022/0188278 A1* | 6/2022 | Butterstein | G06F 11/0772 |
| 2024/0346046 A1* | 10/2024 | Becker | G06F 16/258 |

* cited by examiner

Primary Examiner — Hasanul Mobin
(74) Attorney, Agent, or Firm — Zilka-Kotab, P.C.

(57) ABSTRACT

As described herein, a system, method, and computer program are provided for automatic generation of feed loader applications. An input defining configuration details for a target repository is received. The input is used to automatically generate an application configured to load data to the target repository. The application is deployed for use in loading data in one or more given data files to the target repository.

9 Claims, 5 Drawing Sheets

SYSTEM, METHOD, AND COMPUTER PROGRAM FOR AUTOMATED GENERATION OF FEED LOADER APPLICATIONS

FIELD OF THE INVENTION

The present invention relates to interfaces for loading data feeds to data repositories.

BACKGROUND

Typically, in order to load data into a target repository, an interface to the target repository must be custom developed based on both the format of the data and the configuration of the repository. This interface typically includes both a programmatic interface as well as a graphical user interface (GUI), and may be referred to a feed loader application. Currently, such interfaces must be manually coded and deployed, which requires considerable time and cost.

There is thus a need for addressing these and/or other issues associated with the prior art. For example, there is a need for an automated process to generate feed loader applications.

SUMMARY

As described herein, a system, method, and computer program are provided for automatic generation of feed loader applications. An input defining configuration details for a target repository is received. The input is used to automatically generate an application configured to load data to the target repository. The application is deployed for use in loading data in one or more given data files to the target repository.

DETAILED DESCRIPTION

Figure 1:
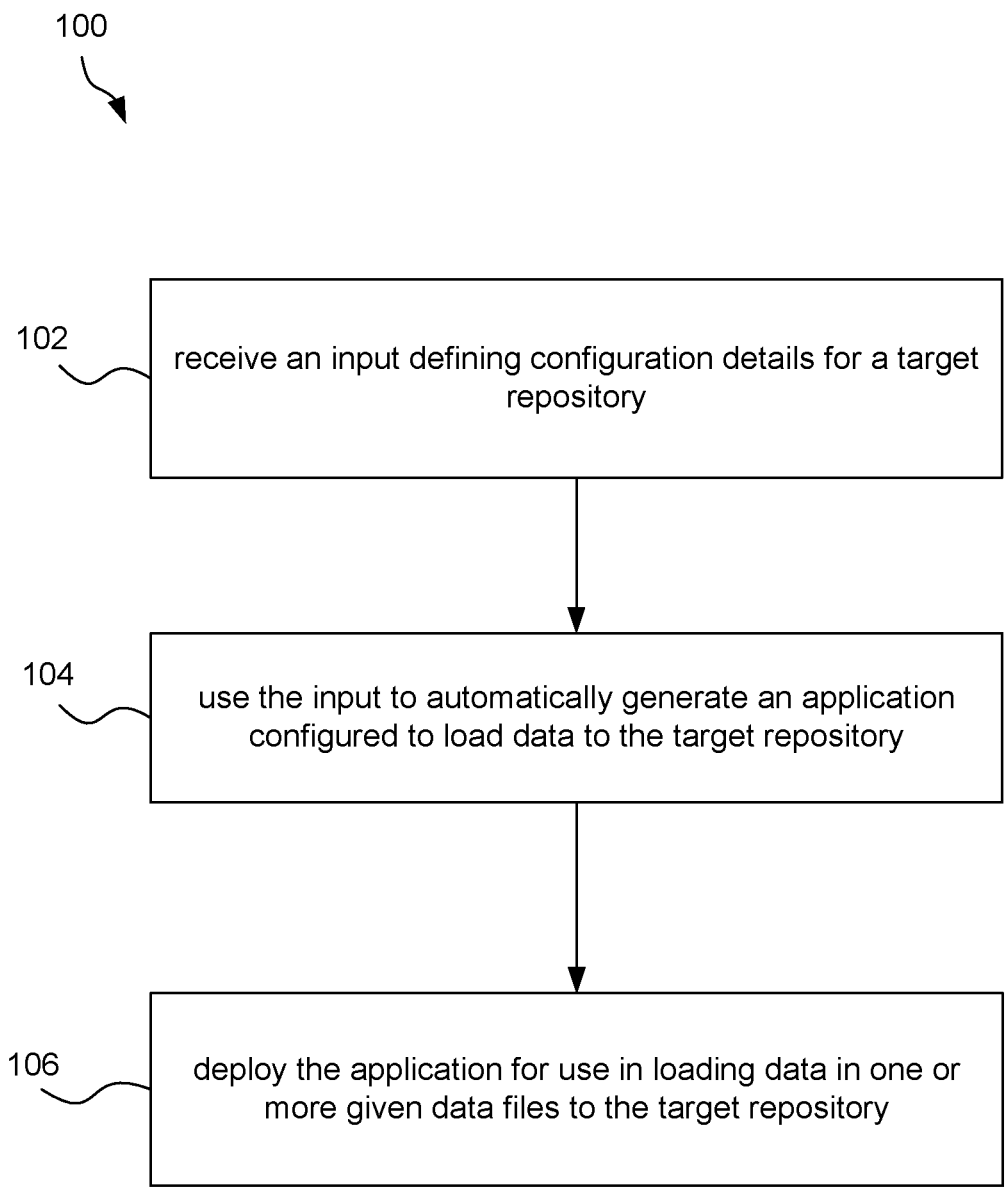
FIG. 1 illustrates a method for automatically generating a feed loader application, in accordance with one embodiment.

FIG. 1 illustrates a method 100 for automatically generating a feed loader application, in accordance with one embodiment. The method may be carried out by a computer system, such as that described below with respect to FIGS. 4 and/or 5.

In operation 102, an input defining configuration details for a target repository is received. The target repository refers to any existing data structure configured to store data. In an embodiment, the target repository may be a database having one or more defined tables which in turn have one or more defined columns.

The input may be received in accordance with a defined format, in an embodiment. For example, the input may be received as a configuration file having parameters defining the configuration details for the target repository. The configuration file may be formatted in accordance with the defined format.

In an embodiment, the input may be received from a user. For example, the input may be received in the configuration file which may be generated by the user. In an embodiment, the input may be received via tool configured to automatically generate feed loader applications for given target repository configuration details.

The configuration details refer to information that defines a configuration of the target repository. In an embodiment, the configuration details for the target repository indicate an identifier (e.g. name) of a table included in the target repository. In an embodiment, the configuration details for the target repository indicate an identifier (e.g. name) of one or more columns included in the table. It should be noted that the configuration details are not required (by the method 100) to include the identifier of every column included in the table.

In an embodiment, the configuration details for the target repository indicate an identifier of a sequence to be used for key creation. The sequence may include the key creation process to use during loading of data to the target repository. In an embodiment, the configuration details for the target repository indicate an identifier of a schema of the target repository.

The input may also define additional information. In an embodiment, the input may define a file name pattern to be required to be used for each given data file having data to be uploaded to the target repository. In an embodiment, the input may be define a name for the application to be generated from the input (described below).

In operation 104, the input is used to automatically generate an application configured to load data to the target repository. The application refers to executable code configured to load data from a given data file to the target repository. In an embodiment, the application may include a programmatic interface to the target repository through which data can be loaded to the target repository. In an embodiment, the application may include a graphical user interface (GUI) through which the a data file can be specified for causing the data therein to be loaded to the target repository.

In operation 106, the application is deployed for use in loading data in one or more given data files to the target repository. Deploying the application refers running the application in a production environment, in an embodiment. In an embodiment, deploying the application includes making the application accessible for use. In an embodiment, the deployed application is made accessible for use via a uniform resource locator (URL).

In an embodiment, the application may be configured to receive a request to load data in a data file to the target repository, where a name of the data file matches a file name pattern included in the configuration details. In an embodiment, the application may be configured to read a header from the data file, where the header matches an identifier of one or more target repository table columns included in the configuration details. In an embodiment, the application may be configured to load the data in the data file to the target repository table columns.

In an embodiment, the application may be configured to display to a user a result of the loading of the data in the data file to the target repository. In an embodiment, the application may be configured to allow the user to accept or reject the result. In an embodiment, the application may include a plurality of validation steps to be performed prior to loading data to the target repository. In an embodiment, the application may be configured to store a history of one or more given data files from which data was loaded to the target repository.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
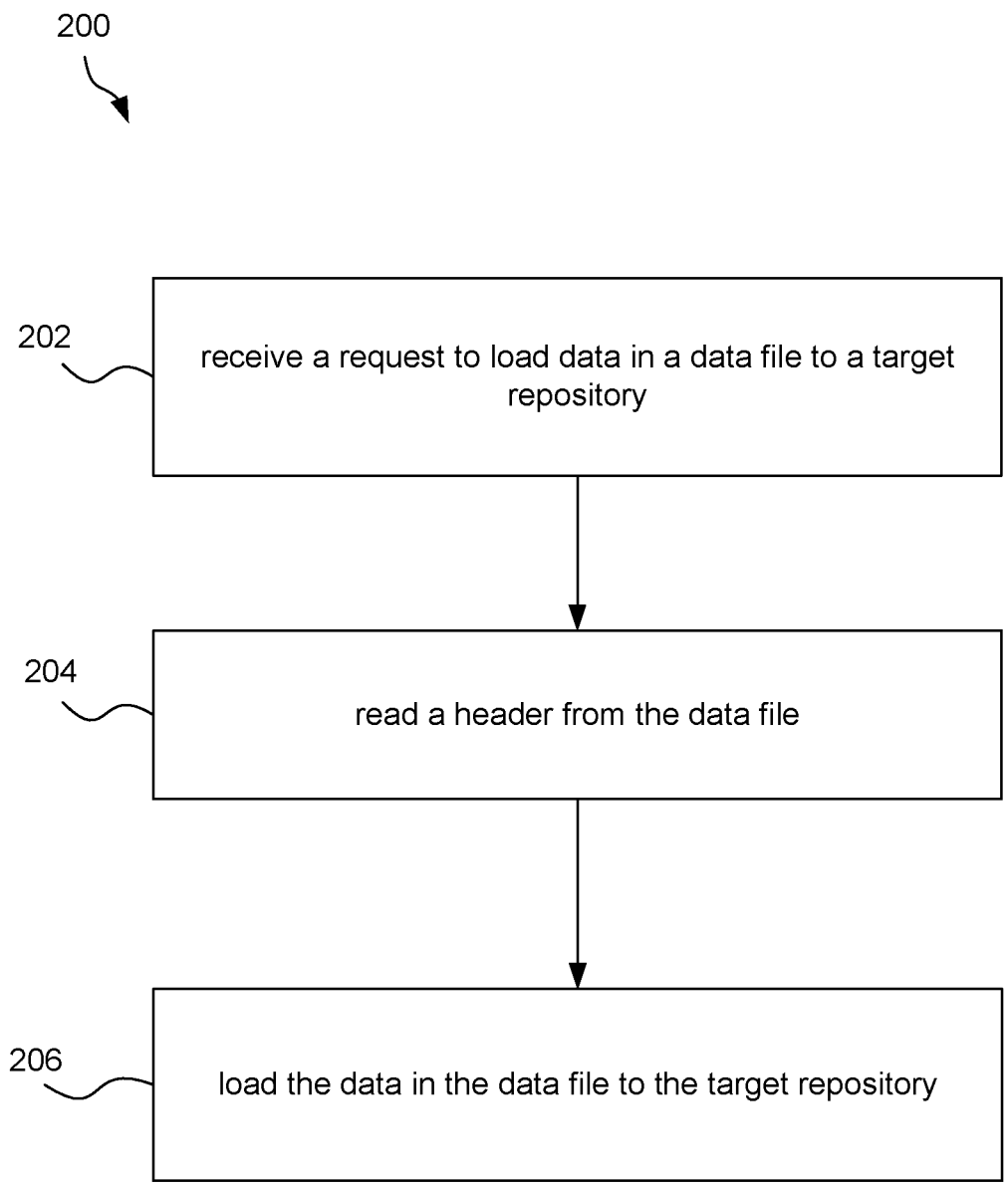
FIG. 2 illustrates a method for using an automatically generated feed loader application, in accordance with one embodiment.

FIG. 2 illustrates a method 200 for using an automatically generated feed loader application, in accordance with one embodiment. The automatically generated feed loader application refers to the application automatically generated and deployed in accordance with the method 100 of FIG. 1. Thus, the method 200 may be performed for using the application to load data in a data file to the target repository. The method 200 may be carried out in the context of the details of the previous figure and/or any subsequent figure(s). Of course, however, the method 200 may be carried out in the context of any desired environment. Further, the aforementioned definitions may equally apply to the description below.

In operation 202, a request to load data in a data file to a target repository is received. In an embodiment, the request may be received via a GUI of the feed loader application. In an embodiment, the request may be received with a location of the data file. In an embodiment, a name of the data file may match a file name pattern included in configuration details used to generate the feed loader application.

In operation 204, a header is read from the data file. The header may be read by the feed loader application. In an embodiment, the header matches an identifier of one or more target repository table columns included in the configuration details used to generate the feed loader application.

In operation 206, the data in the data file is loaded to the target repository. The data may be loaded by the feed loader application. In an embodiment, the data may be loaded to the target repository table columns.

As an option, a result of the loading of the data in the data file to the target repository may be displayed. In an embodiment, a user may be allowed to accept or reject the result. Rejection of the result may cause the loaded data to be removed from the target repository. In an embodiment, the feed loader application may store, as a historical record, details of the loading of the data (e.g. when the result is accepted by the user).

In an embodiment, the method 200 may include the feed loader application performing one or more validation steps prior to loading the data to the target repository. For example, the application may validate that the name of the data file matches the file name pattern included in configuration details used to generate the feed loader application. As another example, the application may validate that the header of the data file matches the identifier of one or more target repository table columns included in the configuration details used to generate the feed loader application.

Figure 3:
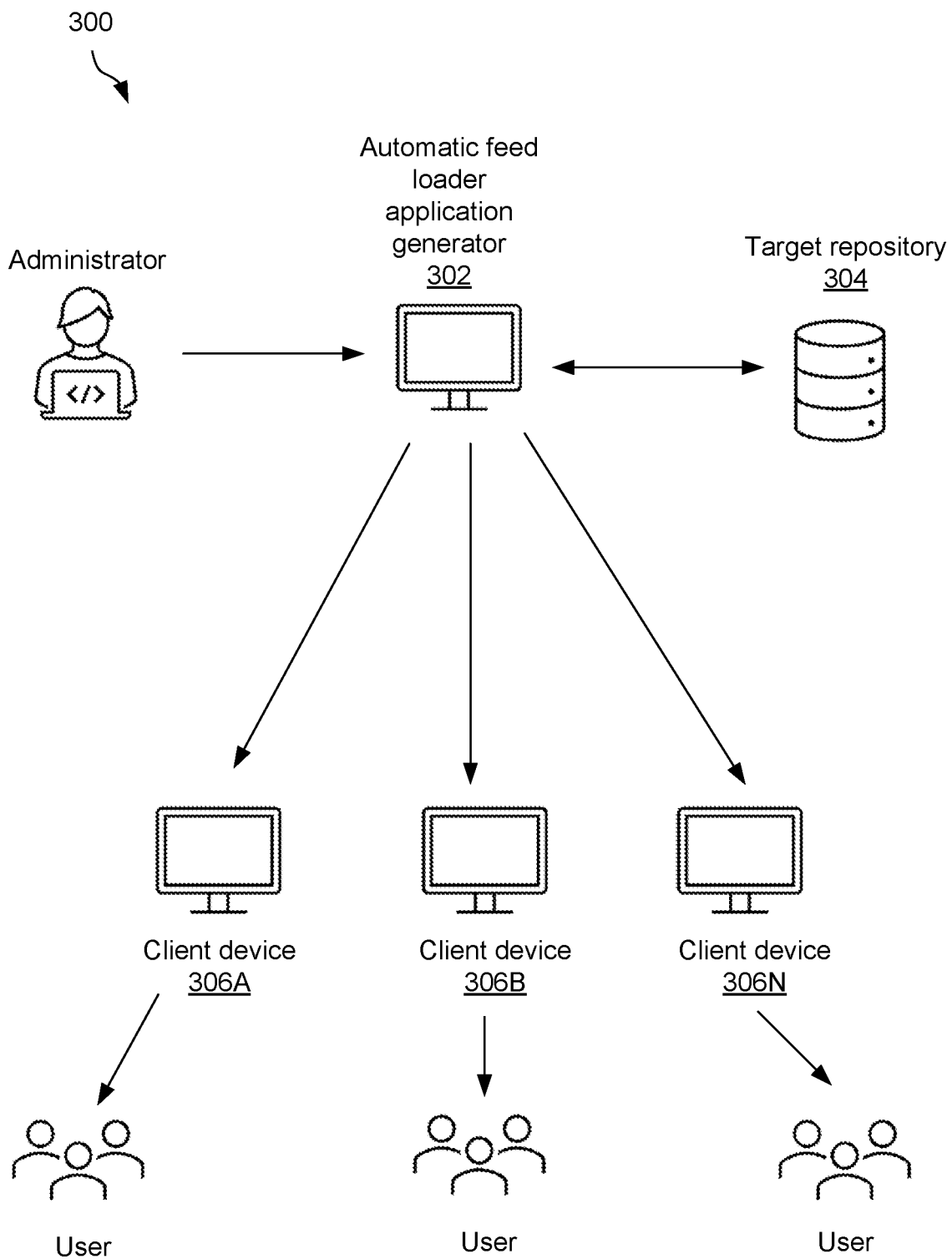
FIG. 3 illustrates a flow diagram of a system for automatic generation and deployment of feed loader applications, in accordance with one embodiment.

FIG. 3 illustrates a flow diagram of a system 300 for automatic generation and deployment of feed loader applications, in accordance with one embodiment. The feed loader applications may be automatically generated in accordance with the method 100 of FIG. 1.

As shown, an administrator accesses a feed loader application generator 302. In an embodiment, the administrator may access the feed loader application generator 302 through a GUI. In an embodiment, the feed loader application generator 302 may execute on a computer system which may or may not be located in a cloud. The feed loader application generator 302 is a platform (e.g. tool) configured to automatically generate feed loader applications from provided configuration details.

The administrator inputs to the feed loader application generator 302 configuration details for a target repository 304. The configuration details may be input as a configuration file. The target repository 304 may be stored remotely from the feed loader application generator 302, and thus may not be an integrated part of the feed loader application generator 302.

The feed loader application generator 302 uses the input to automatically generate a feed loader application. The feed loader application may be deployed to the same computer system on which the feed loader application generator 302 executes, in an embodiment. The feed loader application is configured to load data in a given data file to the target repository 304. The feed loader application is made accessible to a client device 306A (e.g. via a URL) for use by a user of the client device 306A in loading data from a data file to the target repository 304.

While only one administrator and one target repository 304 are shown, it should be noted that the feed loader application generator 302 may interface any number of different administrators and any number of different repositories. Further, the feed loader application generator 302 may generate different feed loader applications, per given configuration details, for use by different client devices 306B-N.

Exemplary Features

Generic in Nature: This Automation will allow onboarding the multiple applications (also referred to as "projects" herein) at a time, each having different data tables, and will allow upload the data to those data tables. In other words, the application generation method is not bounded to a specific database table upload. This allow uploading feeds for any project.

Feed Approval: The feed loader application provides a solution to the challenge of corrupted or wrong data being uploaded can cause failures in downstream tasks relying in the data. A data feed approval feature will allow a client to review the uploaded data and then approve or reject the file. This will give another round of checks before the client approves records for processing, will mitigate the production issue due to the corrupted data, and will allow a client to reject a feed for any interrupted/half loaded feed in order to load same file again with no modification required.

Project Creation GUI: GUI provided to created new project, no need to do manual database inserts or configs and with very minimal number of details/inputs, the project will be ready for Clients. This is access driven via the database table and only the administrator may have access to create projects.

Cost Benefits: This Feed Loader Automation will help save effort and cost for future project development. No need to manually develop separate applications for separate projects, which will save development as well as maintenance efforts.

Multiple Validations and Checks: The fee loader application has multiple validations and checks before loading data to the database for safe and secure data loading. These checks can included a file header check, a data check, a file pattern name check, a file extension check, etc.

History/Tracking: User can check the history of loaded files and corresponding details like record count, upload date, uploader's name, etc.

Backward Compatibility: User can configure old working projects as well as new projects.

Exemplary Implementation

App Server—JBOSS, Wildfly.
DATABASE—Oracle.
Backend—Java, SpringBoot
FrontEnd—React Database should have the FIRST_CONFIG table which will be used to store the config related to this Project. Table structure includes columns for KEY, PROCESS, CATEGORY, TAG, VALUE, COMPONENT, TAG1, TAG2, TAG3.

Tables are required for Projects Tracking, User Access, and History Tracking.

FEED file should have first line as Header. Header names should be same as column name of the Database table where data will be loaded.

No need to have all columns of table. Whatever data needs to load, keep only those columns in the feed file and project config.

The Config FILE_TABLE_HEADER columns sequence should be same as data file headers.

Data table should have: KEY—Primary unique key; GENRE_FEEDLDR_FEED_TRACKER_KEY—Feed tracking key; FIRST_STATUS—For Approval and Report purpose and transaction processing status; FIRST_MESSAGE—Description of transaction processing.

Exemplary Implementation Process

Users can Create Project using a URL below and user should have admin rights.

Feed loader URL for any project will be as mentioned consist of Project-Name which user/admin has provided while creating project.

While creating a project, the user needs to provide below Configs and follow Rules:
1. PROJECT NAME—Name of the project should be unique, and it will be used in project URL page for loading feed. Ex: AlphaProject
2. PROJECT DESCRIPTION—High level project description for this project and use of it.
3. FILE NAME PATTERN—data file name should start with FILE NAME PATTERN. Ex: GenericOrderUpdate
4. FILE TABLE HEADER—This field is important. File header should be the same as the database table column names and in the same sequence as the user will put in the data file. Headers should be comma separated and without any space. No need to have all columns of table, keep only those many columns name in which the data needs to load and in input data file. Ex: ABC, XYZ_NEW,ASD,DATE_INSERTED
5. DATA—table should have below 4 columns—KEY—Primary unique key; GENRE_FEEDLDR_FEED_TRACKER_KEY—Feed tracking key; FIRST_STATUS—For Approval and Report purpose, you can store the transaction processing status here; FIRST_MESSAGE—brief description of proceed record.
6. TABLE NAME—Name of Table where feed data will be loaded. Ex: NEW_ALPHA_DETAILS
7. SEQUENCE NAME—Sequence name which will be used for Data table and key creation. Ex. NEW_ALPHA_DETAILS_SEQ
8. SCHEMA_NAME—database Schema name Ex. FIRST
9. INSTRUCTIONS—These are the special instructions/guidelines which will be shown on project GUI page and User will refer to this while loading file. Make use of semicolons to separate the instructions. Users can put all important validations/instructions related to the project.

After submission, a new project will be created, and all configurations will be stored in a database. Now we can see the newly created project details in the Project List Tab.

Perform the basic Sanity and test a couple of feed loadings. Project will be ready to deliver to client for feed loading.

Exemplary Additional Configurations

GENRE_FEEDLDR_FEED_TRACKER table—User can check the history of uploaded files in DB.
GENRE_FEEDLDR_PROJECT_HIST table—It will have project history
GENRE_FEEDLDR_ACCESS_ROLE table—User access can be controlled from here.

All configurations will be present in "FIRST_CONFIG" table for all projects
To get all project configs—
select * from FIRST_CONFIG where component='GenericFeedLoader'
To get specific project configs—
select * from FIRST_CONFIG where component='GenericFeedLoader' and tag1='<project-name>'

File Upload:
File Headers in data file should be the same as that of FILE TABLE HEADER (which is same as database table columns) and should be in same sequence.
File name should start with provided FILE NAME PATTERN.
While loading data, for date columns format should be in 'dd/MM/yyyy'.

Create Project:
The new project name should be unique.
Make sure that database table along with sequence is present as details will be required while creating the new project.
3 columns will be auto appended to the headers.
KEY→Primary key of AR table and it will be generated using the seq provided.
GENRE_FEEDLDR_FEED_TRACKER_KEY→This will be tracker key for tracking table.
FIRST_STATUS→To maintain the status of records loaded.
Initial status='WAITING_APRVL'
If Approved='WAITING'
If Rejected='REJECTED'

SUMMARY

To this end, the automatic feed loader application generator is tool that will provide:
Capability to create a feed loader application with minimal configurations for any type of file.

User will have capability to create any number of feed loader applications easily by providing the required configuration details.

User experience will be enhanced through the GUI to upload the data file and download the processing report for the uploaded data file.

No need to do repetitive development and deployment to server.

Figure 4:
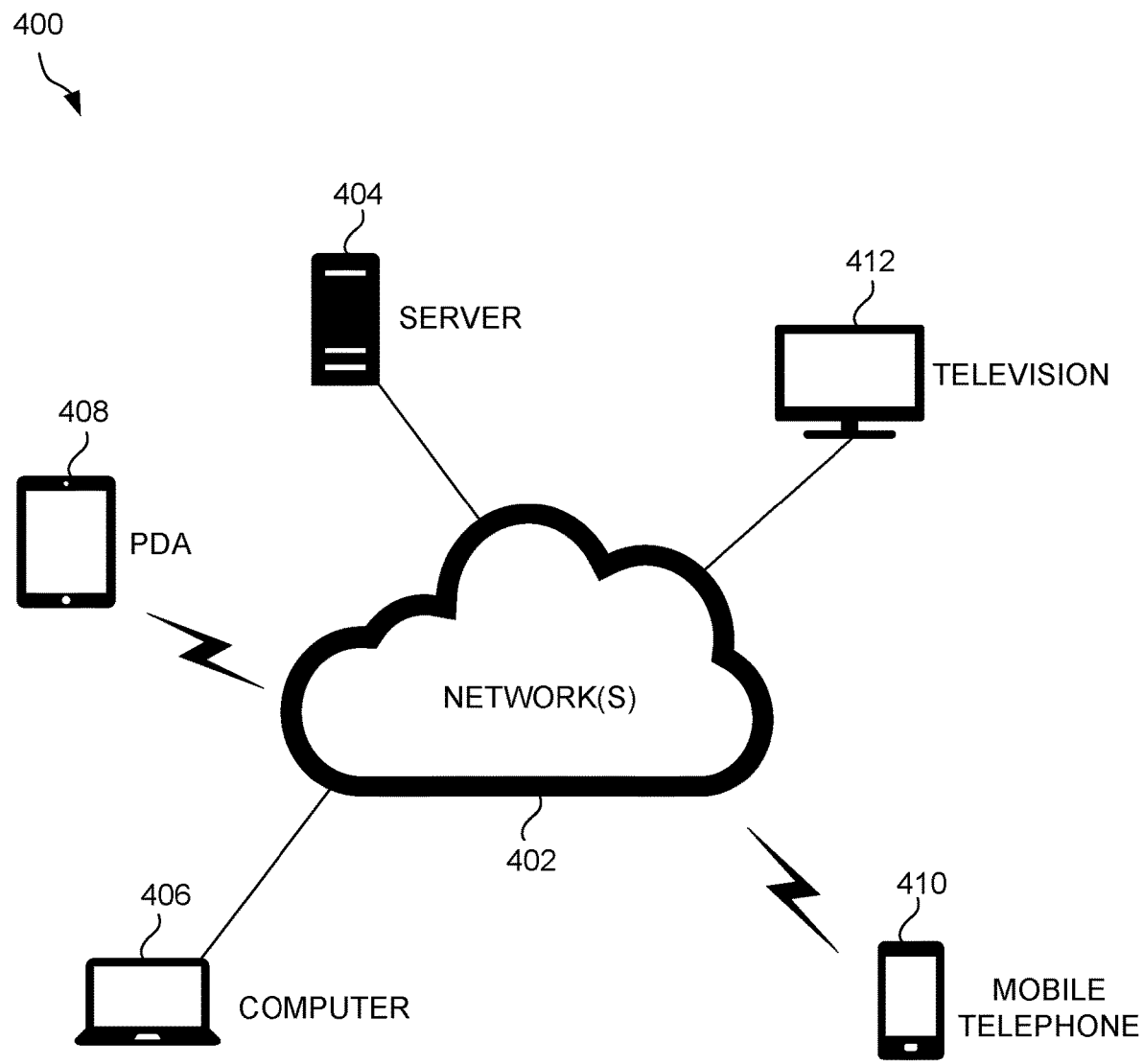
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
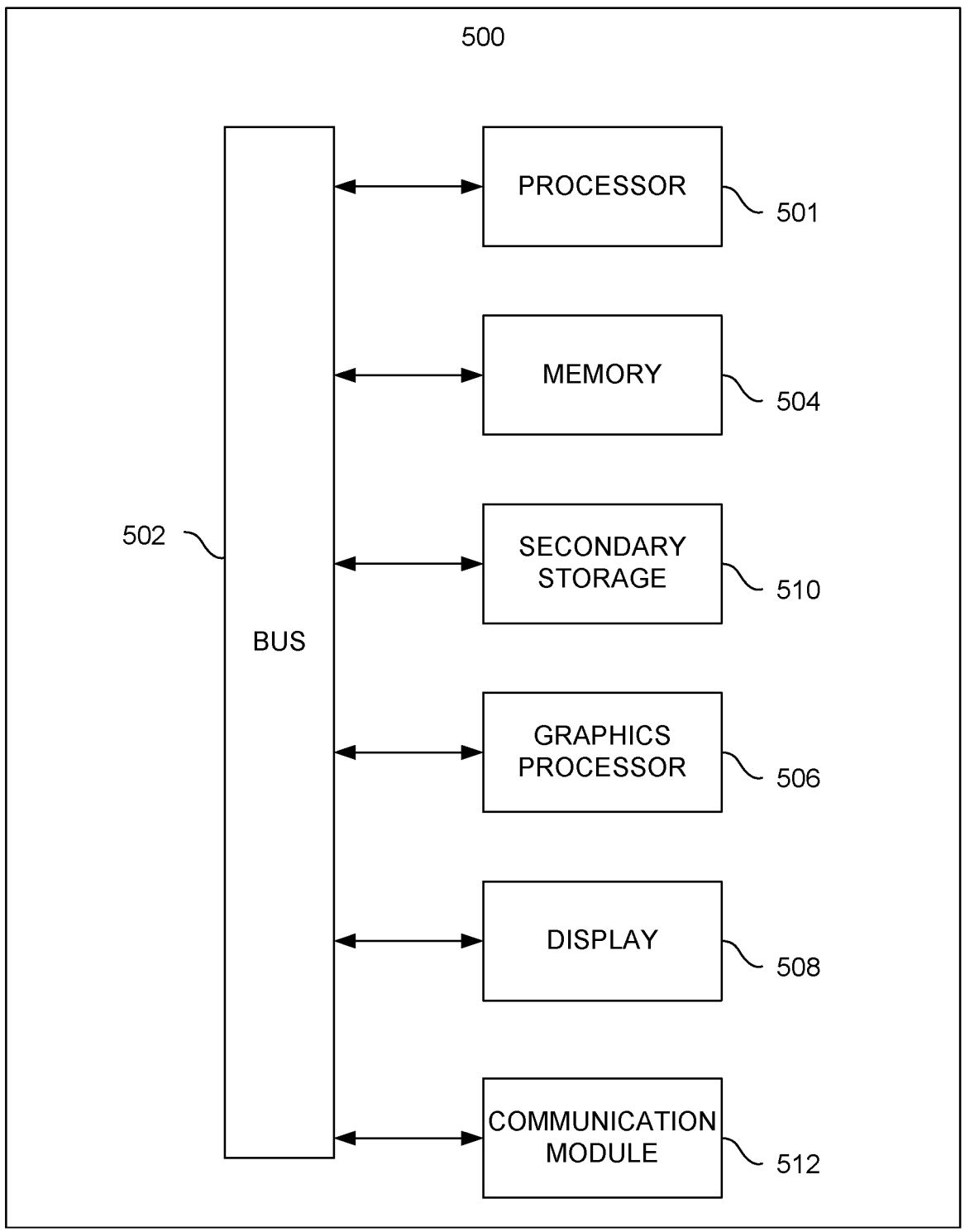
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   receive an input defining configuration details for a target repository, wherein the configuration details include at least:
   an identifier of a table included in the target repository,
   an identifier of one or more columns included in the table, and identifier of a key creation process to use during loading of data to the target repository,
   an identifier of a schema of the target repository, and
   a file name pattern required to be used for each given data file having the data to be uploaded to the target repository;
   use the input to automatically generate executable code that loads the data to the target repository, wherein the executable code includes at least:
   a programmatic interface to the target repository through which the data can be loaded to the target repository, and
   a graphical user interface (GUI) through which a data file can be specified for causing the data therein to be loaded to the target repository; and
   execute the executable code for use in loading the data in a given data file to the target repository, including:
   receive, via the GUI of the executable code, a request to load the data in the given data file to the target repository,
   validate, by the executable code, that a name of the given data file matches the file name pattern included in the configuration details,
   read, by the executable code, a header from the given data file,
   validate, by the executable code, that the header matches the identifier of one or more columns included in the configuration details,
   load, by the executable code, the data in the given data file to the one or more columns included in the table of the target repository and using the key creation process during the loading of the data in the given data file to the one or more columns included in the table of the target repository.

2. The non-transitory computer-readable media of claim 1, wherein the input further defines:
   a name for the executable code.

3. The non-transitory computer-readable media of claim 1, wherein the input is received in a configuration file generated by a user.

4. The non-transitory computer-readable media of claim 1, wherein the executable code is made accessible for use via a uniform resource locator (URL).

5. The non-transitory computer-readable media of claim 1, wherein the device is further caused to:
   display to a user a result of the loading of the data in the given data file to the target repository.

6. The non-transitory computer-readable media of claim 5, wherein the device is further caused to:
   allow the user to accept or reject the result.

7. The non-transitory computer-readable media of claim 1, wherein the executable code stores a history of the given data file from which data was loaded to the target repository.

8. A method, comprising:
   at a computer system:
   receiving an input defining configuration details for a target repository, wherein the configuration details include at least:
   an identifier of a table included in the target repository,
   an identifier of one or more columns included in the table, and identifier of a key creation process to use during loading of data to the target repository,
   an identifier of a schema of the target repository, and
   a file name pattern required to be used for each given data file having the data to be uploaded to the target repository;
   using the input to automatically generate executable code that loads the data to the target repository, wherein the executable code includes at least:
   a programmatic interface to the target repository through which the data can be loaded to the target repository, and a graphical user interface (GUI) through which a data file can be specified for causing the data therein to be loaded to the target repository; and executing the executable code for use in loading the data in a given data file to the target repository, including:

receiving, via the GUI of the executable code, a request to load the data in the given data file to the target repository, validating, by the executable code, that a name of the given data file matches the file name pattern included in the configuration details, reading, by the executable code, a header from the given data file, validating, by the executable code, that the header matches the identifier of one or more columns included in the configuration details, and loading, by the executable code, the data in the given data file to the one or more columns included in the table of the target repository and using the key creation process during the loading of the data in the given data file to the one or more columns included in the table of the target repository.

9. A system, comprising:

a non-transitory memory storing instructions; and one or more processors in communication with the non-transitory memory that execute the instructions to:

receive an input defining configuration details for a target repository, wherein the configuration details include at least:

an identifier of a table included in the target repository, an identifier of one or more columns included in the table, and identifier of a key creation process to use during loading of data to the target repository, an identifier of a schema of the target repository, and a file name pattern required to be used for each given data file having the data to be uploaded to the target repository;

use the input to automatically generate executable code that loads the data to the target repository, wherein the executable code includes at least:

a programmatic interface to the target repository through which the data can be loaded to the target repository, and a graphical user interface (GUI) through which a data file can be specified for causing the data therein to be loaded to the target repository; and execute the executable code for use in loading the data in a given data file to the target repository, including:

receive, via the GUI of the executable code, a request to load the data in the given data file to the target repository, validate, by the executable code, that a name of the given data file matches the file name pattern included in the configuration details, read, by the executable code, a header from the given data file, validate, by the executable code, that the header matches the identifier of one or more columns included in the configuration details, load, by the executable code, the data in the given data file to the one or more columns included in the table of the target repository and using the key creation process during the loading of the data in the given data file to the one or more columns included in the table of the target repository.

\* \* \* \* \*